May 13, 1969 D. R. HOLT ET AL 3,444,336

PRESSURIZED CABLE FAULT SIGNAL CIRCUIT

Filed July 22, 1966

INVENTORS
Donald R. Holt
Wallace E. Jones, Jr.

BY B. B. Olm
ATTORNEY

United States Patent Office 3,444,336
Patented May 13, 1969

3,444,336
PRESSURIZED CABLE FAULT SIGNAL CIRCUIT

Donald R. Holt and Wallace E. Jones, Jr., Durham, N.C., assignors, by mesne assignments, to D. O. Creasman Electronics, Inc., Candler, N.C., a corporation of North Carolina Filed July 22, 1966, Ser. No. 567,194
Int. Cl. H04b 3/46; G08b 21/00
U.S. Cl. 179—175.3 7 Claims

ABSTRACT OF THE DISCLOSURE

A system for the continuous monitoring of pressure, by pressure operated switches at selected points along the length of a pressurized cable by use of working cable pairs. Each switch is associated with a different cable pair. Whenever the cable pair is in use by a telephone subscriber the monitoring system for the associated cable pair is disabled.

This invention is generally concerned with circuitry for monitoring the condition of a telephone line and giving a warning signal in the presence of certain kinds of faults. The invention is more specifically directed to circuitry for detecting the loss of pressure in a pressurized telephone cable and producing a signal at the central office to indicate such loss.

The use of pressurized cables for telephone service has been a long established practice and it is well known to provide pressure sensitive switches at selected locations along a telephone cable for the purpose of providing means by which loss of pressure at such locations can be detected. However, a review of prior practices and of the several prior art patents which have been granted for telephone cable pressure sensing systems reveals that the most common approach has been to provide a system which depends upon interrogation rather than continuous monitoring. That is, the usual prior art system requires an operator at some central office location to sequentially check or interrogate the condition of the several pressure sensing switches. This is generally a matter of effectively taking resistance readings for each switch and interpreting the resistance reading as indicating whether the pressure switch at each respective location is closed or open corresponding to a pressure loss or correct pressure as the case may be. Wheatstone bridges and similar test apparatus are frequently employed. This interrogating operation is time-consuming and the interrogating system is most often complex and expensive to install.

Another characteristic of the usual prior art pressurized telephone cable pressure sensing system is that the system depends on the employment of a spare or defective cable pair for several switches and which is useful only for the pressure sensing function and has no utility for message or income-producing purposes. Thus, assuming a typical pressurized cable is one mile in length and has five spaced pressure sensors, the system for detecting pressure loss according to prior art practices would require allocation of a spare cable pair on which all of the sensors would be placed and which would otherwise be available for message carrying and income-producing purposes. To the extent that prior art pressure sensing systems have utilized working cable pairs in connection with pressure sensing, the systems have required the cable pairs to be out of service when being interrogated for pressure sensing thus causing annoyance to telephone customers and to some extent loss of income. It can also be observed that prior art pressure detecting systems have taught various visual and audible alarms but such alarms have required the continuous use of non-working lines.

With the foregoing in mind the primary object of the present invention is to provide an improved circuit means for continuous monitoring of pressure at selected points in a pressurized telephone cable by use of working cable pairs.

Another object is to utilize working cable pairs for pressure monitoring of a pressurized telephone cable but without impairing the usefulness of such pairs for normal commercial service.

Another object is to provide a pressure monitoring system for a pressurized telephone cable which automatically signals loss of pressure without requiring interrogation.

Another object is to provide a pressure monitoring system for a pressurized telephone cable in which each of a plurality of working cable pairs contain pressure switches but at different locations along the length of the cable and arranged so that the cable is being continuously monitored at all such locations.

These and other objects will become apparent from the description which follows and from the drawings, in which.

Figure 3:
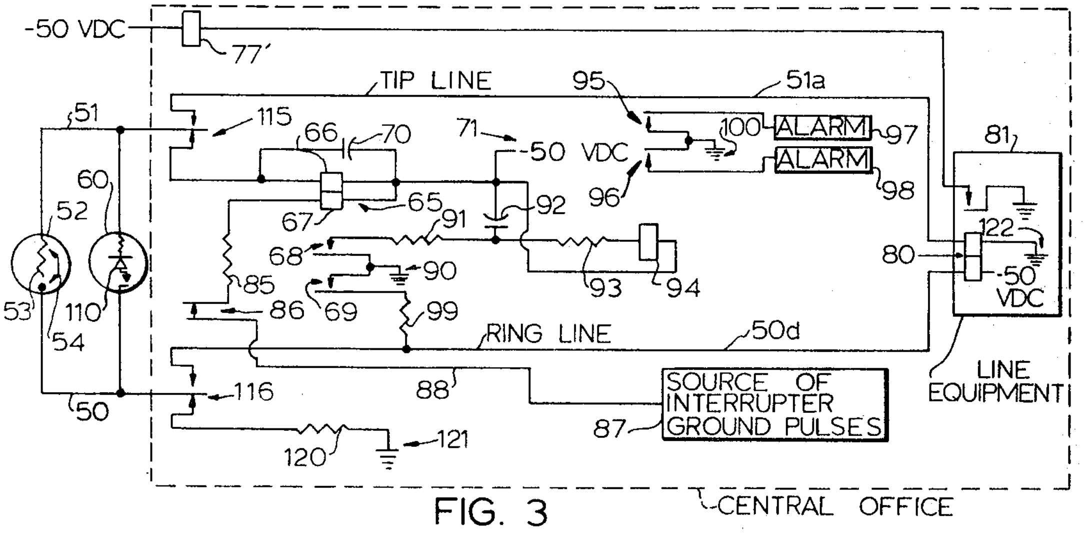
FIGURE 3 is a circuit diagram similar to FIGURE 2 but of another embodiment.

The invention in general is directed to providing a plurality of pressure-operated switches at selected locations along the length of a pressurized cable so as to detect loss in pressure at each such location. Each pressure switch is placed across a particular working cable pair and closing of the switch, corresponding to a loss of pressure below some predetermined amount, acts to place across the line a predetermined resistance, preferably in the order of 20,000 ohms and of a value which is substantially higher than the resistance corresponding to the telephone set utilizing the same cable pair and which may, for example, be in the order of 3,000 ohms. These switch and set resistances will be spoken of as "operative resistances." For each such cable pair having a pressure switch there is provided at the central office auxiliary circuitry forming part of the invention and which acts to continuously monitor the condition of the pressure switch except when the cable pair is being used by a subscriber. That is, the auxiliary circuitry of the invention acts to continuously monitor the condition of the pressure switch but such auxiliary circuitry responds to the current drawn by the telephone set operative resistance by becoming disabled and essentially assuming a non-monitoring state whenever the subscriber uses the cable pair in which the switch is installed. Thus, unlike any of the prior art circuitry known to applicants, the present invention enables employment of working cable pairs in a pressurized cable but without affecting their availability for normal subscriber service.

Whenever a pressure switch is closed in the circuitry of the invention and the cable pair in which the switch is installed is not being used by its subscriber, the monitoring circuit responds to the current drawn by the operative resistance of the switch by activating an alarm in the central office which can be visual or audible or both but in either case acts to call the central office operator's attention to the loss of pressure and the general location since each switch location is known. The central office operator is thus not required to sequentially interrogate the condition of each of the pressure switches as in the usual prior art or to interrogate a plurality of switches on a single cable pair but rather is automatically advised by signal whenever any pressure switch is closed. The circuitry of the invention also provides means for releasing the alarm automatically in the event of short interval faults such as might be caused by a workman working in an area where a pressure switch is installed. The invention circuitry in one embodiment also provides means by which the pressure switch and its related resistor are effectively removed from the circuit whenever the cable pair in which the switch is located is being used by a subscriber. This last feature of the invention involves reversing the line polarity whenever the telephone set is being used and serves to reduce or eliminate under certain conditions various pulse signalling errors which are sometimes caused to appear in central office equipment by the presence of a closed pressure switch in a working cable pair.

Figure 1:
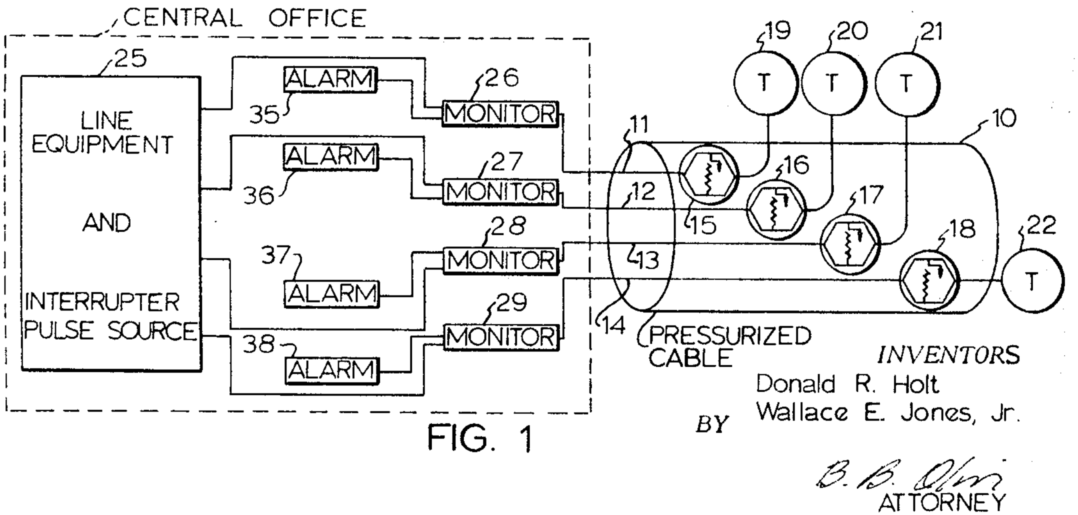
FIGURE 1 is a generalized diagram of a pressurized telephone cable system incorporating the invention.

In FIGURE 1 there is shown a somewhat generalized diagram in which a pressurized cable 10 encloses representative working cable pairs 11, 12, 13 and 14. Pressure switches 15, 16, 17 and 18 are located at predetermined locations along the length of cable 10 and the cable pairs service the telephones labelled T and numbered respectively 19, 20, 21 and 22. At the central office there is the usual central office equipment 25 including line equipment and an interrupter pulse source which are useful in the embodiment being described. For each of the cable pairs 11, 12, 13 and 14, being used as an example, there is provided an auxiliary monitor circuit and alarm as indicated by the monitors 26, 27, 28 and 29 and the alarms 35, 36, 37 and 38. As is explained in more detail later in the description each of the monitor circuits 26, 27, 28 and 29 will actuate its respective alarm whenever the corresponding pressure switch is closed so as to indicate a loss of pressure. Thus, if pressure switch 15 is closed, monitor 26 will actuate alarm 35. However, if the subscriber puts the corresponding telephone into use the monitoring and alarm circuitry will be disabled and the corresponding cable pair will operate in a normal manner. For example, if pressure switch 15 is open, monitor 26 will continuously monitor its condition through cable pair 11 so long as the telephone 19 is not being used. Once telephone 19 is placed into use the cable pair 11 becomes available for message purposes and monitor 26 is disabled. On the condition of pressure switch 15 being closed, the alarm 35 will be actuated and remain actuated so long as telephone 19 is not being used. Immediately upon the subscriber's placing telephone 19 into use the monitor circuit 26 and alarm 35 will be disabled and will remain disabled so long as telephone 19 is in use. However, once use of telephone 19 is terminated and assuming that the pressure switch 15 remains closed the alarm 35 will again be actuated and will remain actuated until cut off by an operator or until the pressure fault has been corrected and switch 15 has again opened. Irrespective of whether the pressure switch is open or closed, use of the telephone will not cause actuation of the alarm. That is, even though the placing of a telephone in service changes the operative resistance across the cable pair at the location of the telephone the amount of such resistance change is substantially less than the resistance change brought about by closing of the operative resistance of a pressure switch at or near the same location and the difference in current drawn by the cable pair under the two conditions, i.e. telephone use versus pressure switch closing, is used as means for discriminating between the two conditions and preventing alarm actuation except when the telephone is not in service.

Figure 2:
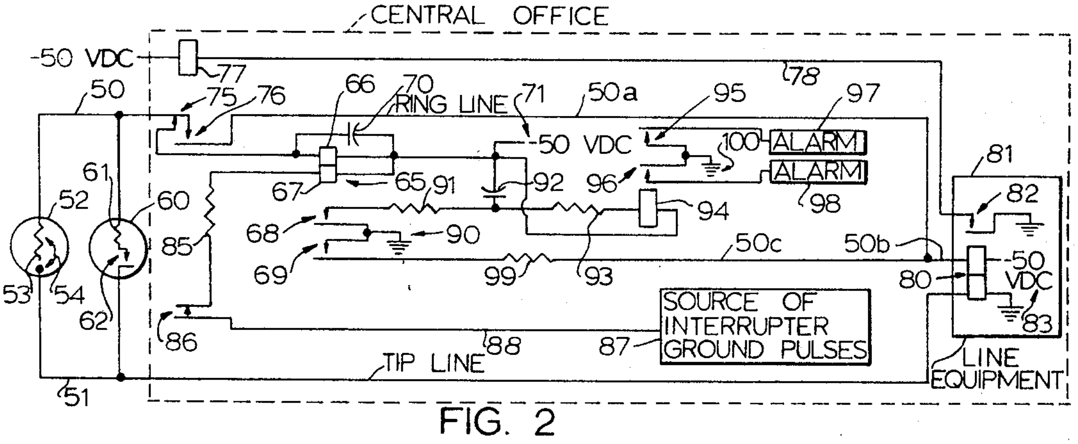
FIGURE 2 is a circuit diagram of a system incorporating the invention in conjunction with a single pressure sensing switch and working cable pair.

Reference is next made to FIGURE 2 in which a monitoring and alarm circuit for one working cable pair is shown, it being understood that this same arrangement is duplicated for the number of pressure switches being monitored. In FIGURE 2, the lines 50, 51 represent the lines forming a cable pair for any subscriber line and which are frequently referred to as the "ring" line and "tip" line. The telephone is represented at 52, the telephone set operative resistor at 53 and the telephone handset at 54. A corresponding pressure switch 60 includes an operative resistor 61. As will be better appreciated from later description the values of resistors 53 and 61 will vary widely with different operating conditions but in one system in which the invention has been employed the value of resistor 53, i.e. the telephone operative resistance, has averaged about 3,000 ohms and the value of resistor 61, the pressure switch operative resistance, was selected to be 20,000 ohms. It may be noted here for comparison with the prior art that the usual and essentially standard pressure switch resistance is in the order of 75,000 ohms. The circuitry of the invention is thus utilizing a much lower than standard pressure switch resistance.

Continuing the explanation, the circuitry employs a relay 65 having a first winding 66 of, for example, 500 ohms resistance and a second winding 67 of, for example, 800 ohms resistance. Relay 65 includes a pair of early make contacts 68 and a further pair of contacts 69. One side of both of the windings 66 and 67 are connected to a suitable negative DC source 71 (shown as minus 50 volts DC), minus 50 volts DC being typical. A capacitor 70 is employed as a filter to bypass stray induced alternating current voltages around winding 66. The other side of winding 66 is contacted to line 50, the ring line, through a set of contacts 75 forming part of a make-before-break configuration which includes contacts 76 and which are controlled by relay 77. Relay 77 is in turn controlled by a relay 80 forming part of the central office line equipment generally designated at 81. The contacts 82 of relay 80 are closed in response to energization of relay 80 which in turn, as more fully explained later, is controlled by use of the telephone 52. That is, relay 80 and its associated contacts 82 represent a typical line equipment relay of the kind found in central office equipment and which is connected so as to be energized by placing into service of a selected telephone and in the present instance relay 80 is used to control relay 77.

As further shown in FIGURE 2, the other side of winding 67 of relay 65 is connected through a current limiting resistor 85 and through contacts 86 of relay 77 to a typical central office source of interrupter ground pulses 87 and which may, for example, provide impulses at the rate of 10 interruptions per minute and whose purpose is to aid operation of relay 65 as will be understood from later description. Closing of contacts 68 connects a source of ground potential 90 to a time delay RC network which includes resistor 91 and capacitor 92 connected in series between contacts 68 and the negative source 71 and a resistor 93 connected between a further relay 94 and the junction of resistor 91 and capacitor 92. Relay 94 is an alarm relay and controls one or more sets of contacts such as contacts 95, 96 and whose purpose is to provide the desired alarm or alarms previously discussed. In the embodiment of FIGURE 2 as an example there is provided a pair of alarms 97, 98 one of which may be audible and the other visual or the alarms may be directed to different locations.

To complete the description it will be noticed that contacts 69 of relay 65 are connected through a current limiting resistor 99 and through line **50*c* to line 50*b* which effectively forms a continuation of line 50 through line 50*a* whenever contacts 76 of relay 77 are closed. However, when contacts 69 are closed it will be noticed that line 50*b* is connected to ground source 90.** Operation of the circuitry of FIGURE 2 will now be explained first in connection with operation of the alarm in a situation where the telephone is assumed not to be in use and next in connection with a situation where the telephone is put in use to show how the monitoring circuit is disabled and the cable pair made available for normal use.

Ground pulses are continuously applied from interrupter source 87 through line 88 and contacts 86 to winding 67 of relay 65. The strength of the field in winding 67 is insufficient to close either contacts 68 or 69. Now assuming that contacts 62 of pressure switch 60 are closed, ground from the line 51 will be connected through resistor 61 of switch 60 to line 50 and through contacts 75 to winding 66 of relay 65. With windings 66 and 67 both energized the early make contacts 68 will close each time a pulse is applied to winding 67. However, the circuit is designed such that there will be insufficient current in this condition to close the late make contacts 69. Closing of contacts 68 acts to connect the ground source 90 to the previously mentioned RC circuit comprising capacitor 92 and resistors 91 and 93. Charging of capacitor 92 acts to delay operation of relay 94 about 10 to 12 seconds and the value of the RC components are selected for such delay. Such delay acts to prevent actuation of the alarm circuit in the event of a temporary pressure fault or the like as previously described.

As soon as capacitor 92 has charged sufficiently, relay 94 wil be energized from the ground supplied from ground source 90 through contacts 68 and will remain energized as long as contacts 68 remain closed with discharge from capacitor 92 acting to hold relay 94 during those intervals when the pulse source 87 is off. Energization of relay 94 acts to close contacts 95 and 96 and to connect the ground source 100 to the respective alarms 97 and 98, it being contemplated that alarms 97 and 98 would be installed as part of and to complement the usual central office alarm panel. While not shown it will be apparent that the alarm could lock out if desired.

Assuming that the pressure fault which caused switch 60 to close has been corrected and that the pressure at the location has been raised to a level about its adjusted value, the contacts 62 of switch 60 will open. Contacts 68 of relay 65 will open and after a short delay capacitor 92 will discharge thus causing relay 94 to be deenergized and contacts 95 and 96 to open to disconnect the alarms 97, 98. The description will refer next to the manner in which the monitoring circuit is disabled in response to a subscriber putting the telephone 52 into service.

When an outgoing call is made from the telephone 52, the telephone operative resistance 53 is placed across the subscriber's cable pair and ground is connected through resistance 53, through contacts 75 and through winding 66 of relay 65. Relay 65 is designed to respond to the current drawn by the resistance 53 such that it will be energized sufficiently to close both of its contacts 68 and 69. Closing of contacts 69 will act to connect the ground source 90 through line 50*c* to line 50*b* and which in turn is connected within the central office through the winding of relay 80 to a suitable negative DC source 83. As soon as the central office equipment is secured ground will be placed on line 78 to operate relay 77 which will cause contacts 76 to close followed by opening of contacts 75. Contacts 68 and 69 of relay 65 will now open. So long as the telephone 52 remains in use the central office line relay 80 will cause relay 77 to hold contacts 76 closed and thus line 50 will be connected through contacts 76 to line 50*a* directly to the central office so as to bypass the monitoring and alarm circuitry.

Due to the delay in charging capacitor 92 an alarm condition cannot exist when an outgoing call is being initiated except in a case where the delay in access to office trunks is in the order of 4 to 6 seconds. It might be noted here that when the relay 65 is fully energized by reason of being connected to an essentially steady-state ground source as contrasted to being connected to the pulse source 87, capacitor 92 will charge at a faster rate and this accounts for the shorter range of charging time. In any event if there is a delay in landing a particular outgoing call in the central office equipment the monitoring and alarm circuitry will restore to a non-monitoring state when the call is securely landed in the central office. Furthermore, once the subscriber has removed his telephone from service the alarms will be restored after a short time delay caused by the RC network if the pressure switch 60 happens to be closed. Otherwise, if the telephone is taken out of service and switch 60 is open all of the relays 65, 94 and 77 will remain deenergized and the circuitry of the invention resumes its continuous monitoring status.

It has been found that under some circumstances the presence of the pressure switch resistor 61 in the circuit when the cable pair is being used by a subscriber will lead to pulse signalling errors in the central office equipment. That is, if switch 60 happens to be closed at the time the subscriber desires to use the cable pair the auxiliary circuitry of the invention will tie the ring and tip leads through from the subscriber's telephone to the central office as if the auxiliary circuitry of the invention were not present. Nevertheless, if the pressure switch remains closed the pressure switch resistance 61 and telephone resistance 53 will be in parallel across the subscriber cable pair and the joint effect of the two resistances will sometimes produce pulse signalling errors in the central office equipment. The modified circuitry of FIGURE 3 is directed to this problem by reversing line polarity whenever the line is put into subscriber service and will next be described.

At the outset it will be observed that the FIGURE 3 and FIGURE 2 circuits are essentially the same and in fact the functioning of each is generally the same. The present explanation will be limited to what is required to understand the difference in circuit construction and operation. In FIGURE 3 the same numerals are used for the elements which duplicate those in FIGURE 2. Otherwise, it will be noted that a diode 110 is used in the pressure switch 60 and relay 77′, corresponding to relay 77 of FIGURE 2, operates two sets of single pole, double throw contact arrangements 115, 116. Attention is also called to the connection which can be made between the ring lines 50 and 50*d* through the contacts 116 and to the normal connection through contacts 116 between the ring line 50 and the ground source 121 through current limiting resistor 120. The contacts 115 serve the purpose as indicated in FIGURE 3 of normally connecting the tip line 51 through contacts 115 to winding 66 of relay 65 and to the negative source 71 but when relay 77′ is energized it will be seen that line 51 is connected directly to the tip line 51*a* and to the ground source 122.

The circuitry of FIGURE 3 operates essentially like the circuitry of FIGURE 2 except that the contacts 115, 116 provide for what may be considered as reverse polarity being supplied to the cable pair when the line is idle. Note that the polarity of lines 50 and 51 change upon operation of relay 77′. The diode 110 serves to prevent a current flow through the pressure switch resistor 61 when the central office equipment is being pulsed on outgoing calls. Thus, the alarm circuit is disabled and the pressure switch resistor 61 is effectively removed from the circuit whenever the subscriber places the telephone 52 into service and it has been found that such arrangement substantially reduces pulse signalling errors in the central office equipment. It should however be pointed out that only certain types of equipment lend themselves to such reverse polarity operation and as to other types of equipment the circuitry of FIGURE 2 is preferred.

In summary, it will be seen that the invention provides continuous monitoring of pressure through use of a working cable pair subject to interruption of the monitoring at any time the cable pair is desired to be put into service. The invention further provides an automatic alarm for each pressure switch being monitored such that the alarm is actuated at all times when there has been a pressure drop except at such times that the line is in subscriber service. Each time the subscriber service use is terminated the monitoring is restored and the alarm, if the pressure switch is closed, is again actuated. While the circuit has been disclosed in the form of an electrical circuit and relay type switching it will be apparent to those skilled in the art that within the scope of the invention equivalent solid state switching components may be employed in an equivalent circuitry. Other features may also be employed if desired. For example, as previously mentioned the alarms may be provided with lockout relays so as to keep the alarms actuated even though the cable pair has gone into subscriber use. Further, it is contemplated that one monitoring and alarm circuit for each pressure switch-cable pair combination is the preferred form of the invention. However, while not shown, a single master monitor and stepping switch may be employed and arranged to interrogate a plural number of cable pairs in sequence where each has at least one pressure switch. Such an arrangement retains the advantage of using working cable pairs but presents certain operating problems. Those skilled in the art will readily see other modifications of the invention and other ways for employing working cable pairs and a monitoring circuit which can be disabled at any time it is desired to restore the monitored cable pair-switch combination to normal cable service.

Having described the invention, what is claimed is:

1. In a telephone system having a pressurized cable; working subscriber cable pairs in said cable; telephone sets connected to selected said pairs and having individual operative resistances associated therewith; pressure switches selectively located along the length of said cable and having individual operative resistances connectable across a selected said pair; and a central office including the usual line equipment and operating voltage source for each said switch an independently operative pressure monitoring circuit including an electrical alarm, the values of the respective said resistances being selected and the arrangement of said monitoring circuit, the respective cable pair, line equipment and source being such that upon closing of the respective said telephone set resistance and irrespective of the open or closed condition of the respective said switch resistance, current is drawn by said set resistance and said monitoring circuit responds thereto by disabling the respective said alarm and further such that upon closing of said switch resistance when said set resistance is open said monitoring circuit responds to current drawn by said switch resistance and actuates said alarm.

2. In a telephone system as claimed in claim 1 wherein said arrangement is such that the normal transmission continuity of said respective cable pair is broken at all times except when said set resistance is closed and closing of set resistance reestablishes said normal continuity.

3. In a telephone system as claimed in claim 2 wherein said monitoring circuit includes delay circuit means effective to delay the operation of said alarm.

4. In a telephone system as claimed in claim 2 wherein said monitoring circuit includes first relay means having first and second contacts and being responsive to the said current drawn by said switch resistance when said switch resistance is closed and said set resistance is open to close said first contacts, second relay means having third contacts and being responsive to the closing of said first contacts to close said third contacts and actuate said alarm, said first relay means being further responsive to the said current drawn when said set resistance is closed to close said second contacts and signal said line equipment and third relay means having fourth contacts, said third relay means being responsive to said signal to close said fourth contacts, and reestablish said normal continuity by connecting said selected pair to said line equipment.

5. In a telephone system as claimed in claim 4 including delay circuit means between said first and second relay means and being effective to delay operation of said second relay means in the event of short interval faults and the like.

6. In a telephone system as claimed in claim 4 wherein said line equipment includes an interrupted pulse source connected to aid the operation of said first contacts.

7. In a telephone system as claimed in claim 4 wherein said switch includes uni-directional current means in series with said switch resistance and said third relay means includes additional contacts connected to reverse the polarity of the cable pair at said line equipment in response to the closing of said set resistance and said unidirectional current means being arranged to effectively electrically remove said switch resistance in the condition of said set resistance being closed.

References Cited

UNITED STATES PATENTS

| | | |
|---|---|---|
| 3,082,299 | 3/1963 | Reter. |
| 3,105,882 | 10/1963 | Meyer. |
| 3,105,883 | 10/1963 | Higson. |
| 3,259,892 | 7/1966 | Winckelmann. |
| 3,360,617 | 12/1967 | Munson. |

KATHLEEN H. CLAFFY, *Primary Examiner.*

A. A. McGILL, *Assistant Examiner.*

U.S. Cl. X.R.

340—242